United States Patent
Sivabalan et al.

(10) Patent No.: US 7,626,925 B1
(45) Date of Patent: Dec. 1, 2009

(54) METHODS FOR FINDING A MERGE POINT NODE FOR MPLS FAST RE-ROUTE

(75) Inventors: Muthurajah Sivabalan, Kanata (CA); Zafar Ali, Ann Arbor, MI (US); Jean Philippe Vasseur, Dunstable, MA (US); Carol E. Iturralde, Framingham, MA (US)

(73) Assignee: Cisco Technology, Inc., San Jose, CA (US)

( * ) Notice: Subject to any disclaimer, the term of this patent is extended or adjusted under 35 U.S.C. 154(b) by 942 days.

(21) Appl. No.: 10/465,179

(22) Filed: Jun. 19, 2003

(51) Int. Cl.
*H04J 1/00* (2006.01)
(52) U.S. Cl. .......................... 370/228; 714/4
(58) Field of Classification Search ......... 370/216–228, 370/389, 392; 709/239; 714/4
See application file for complete search history.

(56) References Cited

U.S. PATENT DOCUMENTS

| | | | | |
|---|---|---|---|---|
| 6,301,223 B1 | 10/2001 | Hraster et al. | ............... | 370/227 |
| 6,535,481 B1 | 3/2003 | Andersson et al. | .......... | 370/225 |
| 6,738,354 B1 * | 5/2004 | Ashwood Smith | .......... | 370/248 |
| 6,751,190 B1 * | 6/2004 | Swallow | ..................... | 370/217 |
| 7,051,113 B1 * | 5/2006 | Katukam et al. | ............ | 709/239 |
| 7,058,845 B2 * | 6/2006 | Fujita | .............................. | 714/4 |
| 7,082,124 B1 * | 7/2006 | Katukam | ..................... | 370/357 |
| 7,269,132 B1 * | 9/2007 | Casey et al. | ................. | 370/219 |
| 7,330,896 B1 * | 2/2008 | Crump et al. | ............... | 370/392 |
| 2003/0110287 A1 | 6/2003 | Mattson | ...................... | 709/238 |
| 2005/1023792 | * | 10/2005 | Kano et al. | ................. 370/216 |

OTHER PUBLICATIONS

Vasseur, Jean Philippe et al. "Definition of an RRO Node-Id Subobject" May 2003, IETF Internet Draft.

* cited by examiner

*Primary Examiner*—Ricky Ngo
*Assistant Examiner*—Pao Sinkantarakorn
(74) *Attorney, Agent, or Firm*—Edell, Shapiro & Finnan, LLC

(57) ABSTRACT

Methods and apparatus for unambiguously identifying merge points associated with backup label switched paths (LSPs) which substantially bypass border routers included along a primary LSP are disclosed. According to one aspect of the present invention, a method for finding a merge point between a primary LSP and a backup LSP which has a head-end and a tail-end in different regions includes obtaining identifying information, which identifies nodes on the path of the primary LSP, from a record route object associated with the primary LSP. The method also includes comparing a node address of the identifying information with a destination address of the backup LSP or a node address present in a node identifier (node-ID) subobject of the backup LSP to identify the merge point.

26 Claims, 7 Drawing Sheets

METHODS FOR FINDING A MERGE POINT NODE FOR MPLS FAST RE-ROUTE

BACKGROUND OF THE INVENTION

1. Field of Invention

The present invention relates generally to network systems. More particularly, the present invention relates to enabling a backup label switched path (LSP) to be created to bypass a border router, and to enable substantially unambiguously determined if the backup LSP that bypasses a border router merges with a primary LSP that passes through the border router.

2. Description of the Related Art

The demand for data communication services is growing at an explosive rate. Much of the increased demand is due to the fact that more residential and business computer users are becoming connected to the Internet. Furthermore, the types of traffic being carried by the Internet are shifting from lower bandwidth applications towards high bandwidth applications which include voice traffic and video traffic.

As the Internet becomes a multi-media communications medium that is expected to reliably handle voice and video traffic, network protocols must also evolve to support quality-of-service (QoS) requirements such as latency and reliability and to provide guaranteed available bandwidths. One form that this evolution is taking is the advent of MPLS (Multi-Protocol Label Switching) Traffic Engineering which may be supplemented by Diffserv-aware Traffic Engineering. Rather than using conventional IP routing techniques where individual packets travel through the network following paths determined individually for each packet as it progresses through the network, MPLS Traffic Engineering exploits modern label switching techniques to build guaranteed bandwidth end-to-end circuits through a network of label switched routers (LSRs). MPLS has been found to be highly useful in establishing such circuits also referred to as label switched paths (LSPs). MPLS networks employing LSPs may more easily interoperate with other IP-based networks than other virtual circuit-oriented networks employing, e.g., ATM or Frame Relay. Networks based on MPLS Traffic Engineering, especially those supplemented with DiffServ-aware Traffic Engineering are very effective in handling delay and jitter-sensitive applications such as voice over IP (VoIP) and real-time video.

Meeting the demands of businesses and consumers, however, also requires that bandwidth and latency guarantees continue to be met when links or nodes fail. When failure of a link or a node causes the failure of an LSP, the standard routing protocols such as open shortest path first (OSPF) are too slow to be used for fast rerouting of loss-sensitive traffic. In optical networks employing SONET, fast restoration may be provided by means of features incorporated into the SONET protocol. However, where such techniques are not available, other protection mechanisms become necessary to ensure that services are restored within a sufficiently short time, e.g., 50 ms, such that the user experience is not affected.

A network is generally designed to ensure that information may be transferred between nodes within the network. Often, within a network, information is transferred between two specified nodes, i.e., a source node which sends information and a destination node which receives information. When information is to be sent between a source node and a destination node, a circuit path between the two nodes must be established so that leased line services may be provided. Typically, in MPLS networks, LSPs form circuit paths between the two nodes.

An LSP that has been established to carry traffic between a pair of nodes during normal operation, i.e., in the absence of a network node or link failure, is called a primary LSP. Nodes and links that are a part of a primary LSP may suffer failures during the course of operation. In order to ensure that the traffic which is being sent on the primary path may still reach an appropriate destination in the event of a failure within the primary LSP, the links and nodes on the primary LSP may be bypassed. MPLS fast reroute (FRR) is a local protection recovery technique that is often used to bypass nodes and/or links within a network. Nodes and links may be bypassed by one or more LSPs, and such LSPs are called backup LSPs. The path of a backup LSP generally must not include a link or a node that it bypasses.

In order to provide the desired response time upon failure detection, FRR solutions have concentrated on defining backup LSPs in advance so that an appropriate backup LSP may be activated upon detection of a failure very quickly, e.g., typically within a few milliseconds. Traffic may then be rerouted by the node immediately upstream of the failure. As will be appreciated by those skilled in the art, with an FRR technique, a primary LSP may be protected from the failure of a particular node or link on the path of that primary LSP. In an FRR context, a backup LSP may or may not provide end-to-end protection to a corresponding primary LSP. Path protection, on the other hand, is a mechanism which enables a backup LSP to provide end-to-end protection to a corresponding primary LSP.

With FRR, when a protected node or link failure occurs, traffic carried by primary LSPs passing through the protected node or link is switched to the appropriate backup LSP or LSPs that have previously been set up. FIG. 1 is a diagrammatic representation of nodes which are interconnected with a primary LSP and various backup LSPs. Nodes 110 are connected through links 112 within an overall network 100. For example, node 110a and node 110b are connected by link 112a, and node 110b is connected to node 110c by link 112b. The path of a primary LSP 114 is defined to includes nodes 110 and links 112 such that primary LSP 114, as shown, substantially begins at node 110a and ends at node 110e.

Backup LSPs 116 are arranged to bypass various nodes 110 and links 112 when node 110 or link 112 failures occur. A first backup LSP 116a is a next hop (NNHOP) backup LSP that bypasses node 110b and allows traffic to be re-routed substantially around node 110b in the event that node 110b fails. A second backup LSP 116b is an NNHOP backup LSP that bypasses node 110d, while a third backup LSP 116c is an NNHOP backup LSP that bypasses node 110c. A fourth backup LSP 116d is a next hop (NHOP) backup LSP that bypasses link 112c in the event that link 112c fails. It should be appreciated that although other links 112 may also have associated backup LSPs if such links 112 are protected links, such backup LSPs have not been shown for ease of illustration.

As shown, backup LSPs 116 do not pass through the elements that they bypass. By way of example, since backup LSP 116d bypasses link 112c, backup LSP 116d does not pass through link 112c. Likewise, since backup LSP 116a bypasses node 110b, backup LSP 116a does not pass through node 110b.

A primary LSP and a backup LSP should intersect at least at two nodes. A head-end of the backup LSP intersects the primary LSP at a Point of Local Repair (PLR), while a tail-end of the backup LSP intersects the primary LSP at a Merge Point. As will be appreciated by those skilled in the art, the PLR is where the FRR may be triggered when a node or a link failure occurs. When an LSP requesting FRR protection is first set up, a PLR generally needs to select a backup LSP to be used in case of a link or node failure that intersects the primary LSP on a downstream node. In order to select an appropriate backup LSP, the PLR is required to gather information on the set of downstream nodes traversed by the LSP. The gathering of such information typically involves making use of a record route object (RRO) carried in a resource reservation protocol (RSVP) reservation message. If a Merge Point does not exist between a primary LSP and a backup LSP, the PLR does not send traffic from the primary LSP over the backup LSP if the relevant node or link fails.

With reference to FIG. 2, the location of a PLR and a merge point with respect to a primary LSP and a backup LSP will be described. Nodes 210 and links 212 are included in a primary LSP 214. A backup LSP 216 is arranged to bypass node 210b. Backup LSP 216 intersects primary LSP 214 at a PLR 210a and a merge point 210c. Typically, PLR 210a and merge point 210c are nodes that are substantially adjacent to node 210b, which is being bypassed by backup LSP 216. In other words, backup LSP 216 that bypasses node 210b is a NNHOP backup LSP. Hence, when node 210b fails, traffic that is being routed through primary LSP 214 is re-routed through backup LSP 216 between PLR 210a and merge point 210c, thereby effectively protecting primary LSP 214 from the failure of node 210b.

When nodes 210 are located within a single Interior Gateway Protocol (IGP) area, e.g., OSPF, or a single IGP level, e.g., intermediate system to intermediate system (ISIS), PLR 210a may determine if primary LSP 214 and backup LSP 216 intersect at merge point 210c by examining the RRO of primary LSP 214 along with the tail-end address of backup LSP 216. Since nodes 210 are located within a single area or level, for example, all nodes 210 are aware of the full connectivity of all nodes 210, i.e., the IGP topology of all nodes, within the single IGP area or level. The RRO of primary LSP 214 is specified in terms of node-identifiers (node-IDs) of nodes 210 in addition to, or in lieu of, the interface identifiers to nodes 210. Hence, within a single area, or level, or autonomous system, PLR 210a has knowledge of substantially all interfaces attached to the tail-end of backup LSP 216, namely merge point 210c. As a result, by using its IGP topology, PLR 210a may unambiguously identify merge point 210c regardless of whether the RRO of primary LSP 214 specifies node-IDs or interface identifiers.

Backup LSPs may generally be computed using a variety of different methods. A user or a network administrator may statically configure backup LSPs at PLRs. For example, a user of a network administrator may to establish a backup LSP with a path that he or she explicitly specifics. A PLR may also be configured to substantially automatically compute a backup LSP that is diversely routed from the node or the link which is being bypassed by the backup LSP. More specifically, there may be a dynamic process that allows a backup LSP to be dynamically found and established. When configured appropriately, a PLR computes a suitable path and triggers the establishment of the backup LSP. In general, there may be some timer that may be configured to remove backup LSPs that are not being used. This is possible, for instance, if all primary LSPs which were protected by a particular backup LSP are torn down.

A PLR generally may not arbitrarily assign a backup LSP that bypasses a given node or link to protect a given primary LSP that passes through the node or link being bypassed by the backup LSP. In order to be able to protect a primary LSP from the failure of a bypassed node or link, a backup LSP should intersect with the primary LSP at both the PLR and the merge point, as discussed above. Each backup LSP may also be configured to substantially guarantee an acceptable bandwidth during a node or link failure. That is, a backup LSP effectively satisfies the bandwidth requirements associated with the primary LSP which is protected by the backup LSP.

Currently, a PLR may not unambiguously determined if a merge point exists between a backup LSP and a primary LSP when a node that is to be bypassed is a border node, e.g., a boundary or border router, which is located substantially at the border of either an IGP area or level, or an autonomous system. FIG. 3a is a diagrammatic representation of a primary LSP which includes border routers and spans two IGP areas of an autonomous system. An autonomous system 306 includes areas 308. A primary LSP 314 includes nodes 310 and links 312. Node 310b is an area border router.

In order to attempt to bypass node 310b, a backup LSP (not shown) would span both area 308a and area 308b. For example, in order to bypass node 310b, a backup LSP may be established between nodes 310a and 310c. With such a backup LSP, node 310a is a PLR. To assign the backup LSP to primary LSP 314, node 310a, as the PLR, should be able to determine if node 310c is on the path of primary LSP 314. That is, a PLR should determine if a merge point exists between a backup LSP and primary LSP 314 in order to assign the backup LSP to primary LSP 314. Since a PLR may not use its IGP topology to determine the interfaces connected to node 310c, i.e., the tail-end of the backup LSP, it is generally not possible to assign the backup LSP to primary LSP 314. In other words, since a PLR in one area 308a has no access to the topology of a tail-end of a proposed backup LSP that is in another area 308b, the PLR may not unambiguously assign a backup LSP that bypasses border node 310b to primary LSP 314 that spans multiple IGP areas. Hence, a PLR may not determine a merge point without ambiguity.

Similarly, it may not be possible to unambiguously find a backup LSP for protecting a primary LSP from the failure of an asynchronous system border node when the primary LSP spans multiple autonomous systems. As will be appreciated by those skilled in the art, such an LSP is called an inter-autonomous system LSP (inter-AS LSP). FIG. 3b is a diagrammatic representation of a primary LSP which effectively spans two autonomous systems. Nodes 360 and links 362 are on the path of a primary LSP 374 which is partially in a first autonomous system 356 and a second autonomous system 358. Node 360b is a border router as node 360b is located at the borders of autonomous system 356 and autonomous system 358. A PLR, as for example node 360a when node 360b is to be bypassed, may not know the topology of a tail-end of a proposed backup LSP (not shown) whose tail-end is in autonomous system 358. That is, a PLR does not have knowledge of interfaces which are connected to the tail-end of a proposed backup LSP that is partially in autonomous system 356 and partially in autonomous system 358. As such, since a merge point is a point at which the tail-end of a proposed backup LSP intersects primary LSP 374, the location of such a merge point may not be unambiguously identified by the PLR in order to assign a backup LSP to primary LSP 374.

The ability to protect primary LSPs passing through area border routers or autonomous system border routers from the failure of such router via an FRR mechanism reduces the traffic loss to failure in MPLS networks with inter-area or inter-AS traffic engineering. Minimizing such traffic loss is important for providing better services to users. When backup LSPs which protect border routers may not be substantially automatically determined, the ability of service providers to protect inter-area or inter-AS primary traffic engineering from the failure of border routers is generally compromised.

Therefore, what is needed is a method and an apparatus which allows NNHOP backup LSPs which protect border routers to be substantially automatically determined by a PLR. More specifically, what is desired is a system which enables merge points associated with primary LSPs and backup LSPs which protect either area border routers or autonomous system border routers to be substantially unambiguously identified.

SUMMARY OF THE INVENTION

The present invention relates to a system for unambiguously identifying merge points associated with backup label switched paths (LSPs) which substantially protect inter-area or inter-autonomous system (inter-AS) LSPs from failures of border routers. According to one aspect of the present invention, a method for finding a merge point between a primary LSP and a backup LSP which has a head-end and a tail-end in different regions includes obtaining identifying information, which identifies nodes on the path of the primary LSP, from a record route object associated with the primary LSP. The method also includes comparing a node address of the identifying information with a destination address of the backup LSP or a node address present in a node identifier (node-ID) subobject of the backup LSP to identify the merge point.

In one embodiment, the different regions are one of autonomous systems, areas, and levels. In another embodiment, the backup LSP is arranged to bypass a border router 10 or border routers that are part of a path of the primary LSP. The border router is one of an area border router or an autonomous system border router that is located substantially at a border of one of the different regions.

The ability to allow a backup LSP which spans different regions to protect a node such as a border router enables Multiprotocol Label Switching (MPLS) service providers to apply a fast reroute (FRR) mechanism to inter-area or inter-AS traffic engineering LSPs spanning multiple areas or autonomous systems, respectively, and, hence, increase network availability. Using a record route object which includes addresses or identifiers of nodes in a primary LSP allows a point of local repair (PLR) to efficiently identify a merge point substantially without ambiguity when a backup LSP is used to protect the primary LSP from failures of network nodes or links. When a merge point between a primary LSP and a backup LSP is located, the backup LSP may be assigned to protect the primary LSP which passes through the network node or link that is bypassed by the backup LSP.

According to another aspect of the present invention, a method for identifying a merge point between a primary LSP and a backup LSP which bypasses an element in the primary LSP in a network that supports MPLS FRR includes associating a flag with each element in a record route object to indicate whether or not the element represents a network node. If the flag associated with an element in the record route object is set, the element represents a node. Otherwise, the element may or may not represent a node. In other words, the flag is used to unambiguously indicate to the node that examines the record route object that the element associated with the flag is a node. A PLR examines each element of the record route object to see if the flag is set. If the flag associated with an element in the record route object is set, the PLR may unambiguously determine that the element represents a network node. Each node identifier in the record route object is compared to a node identifier associated with a tail-end of the backup LSP to determine if the node identifier in the record route object substantially matches the node identifier of a tail-end of the backup LSP. Finally, the merge point is identified when the node identifier of the tail-end of the backup LSP substantially matches the node identifier in the record route object.

In accordance with still another aspect of the present invention, a method for identifying a merge point between a primary LSP and a backup LSP in a network that supports MPLS FRR includes requesting local topology information associated with a tail-end of the backup LSP and receiving the local topology information. The local topology information includes identifiers or interfaces associated with the tail-end of the backup LSP. The method also includes identifying the merge point regardless of whether the record route object of the primary path contains node identifiers or interface identifiers. In one embodiment, requesting the local topology information includes sending request to the tail-end of the backup LSP, and receiving the local topology information includes receiving a message from the tail-end of the backup LSP.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Multi-protocol label switching (MPLS) fast reroute (FRR) is a technique that generally allows for traffic carried over a primary label switched path (LSP) to be switched to a backup LSP when networks nodes and/or links on the primary LSP fail. However, MPLS FRR may not be used to protect primary LSPs from the failure of routers that are on the border of either autonomous systems or areas within an autonomous system, since a point of local repair (PLR) and a merge point associated with the backup LSP which bypasses such a border router would be in different autonomous systems or areas, respectively. The inability to protect a primary LSP from the failure of are border routers or autonomous system border routers using MPLS FRR would discourage the deployment of inter-area traffic engineering or inter-autonomous system (inter-AS) traffic engineering, respectively, in MPLS networks especially when high network availability is a strong requirement.

By enabling merge points between primary LSPs and backup LSPs to be substantially unambiguously identified when the primary LSPs and the backup LSPs span a plurality of areas or a plurality of autonomous systems, the primary LSPs may be protected from the failure of border routers. Hence, backup LSPs which bypass area border routers and autonomous system border routers may be substantially automatically found, as associated merge points may be readily located. The ability to substantially automatically identify backup LSPs enables inter-area or inter-AS LSPs to be protected from failures of border nodes. Since many service providers require that inter-area LSPs or inter-AS LSPs be protected from the failure of area border routers and autonomous system border routers, the ability to bypass area border routers or autonomous system border routers using backup LSPs enables the requirements of MPLS service providers to be met.

Figure 1:
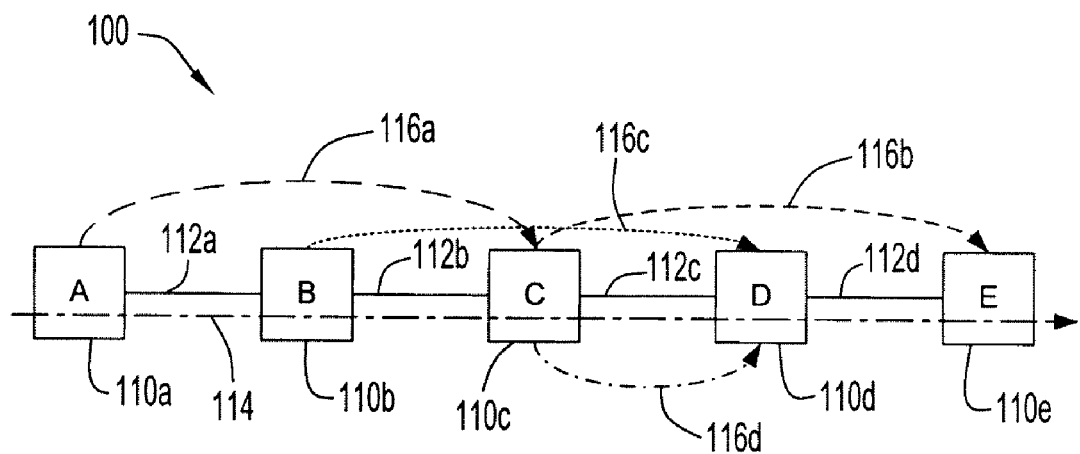
FIG. 1 is a diagrammatic representation of nodes which are interconnected with a primary label switched path (LSP) and various backup LSPs.
Figure 2:
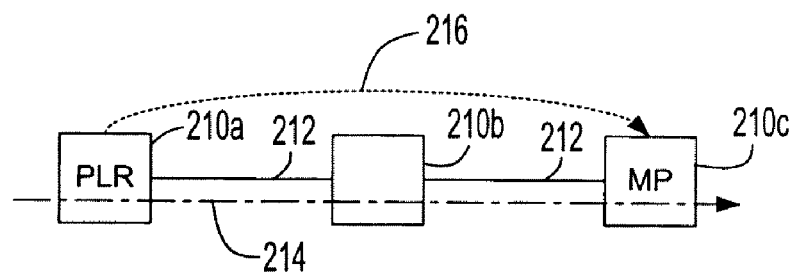
FIG. 2 is a diagrammatic representation of a primary LSP and a backup LSP which intersect at a point of local repair (PLR) and a merge point.
Figure 3A:
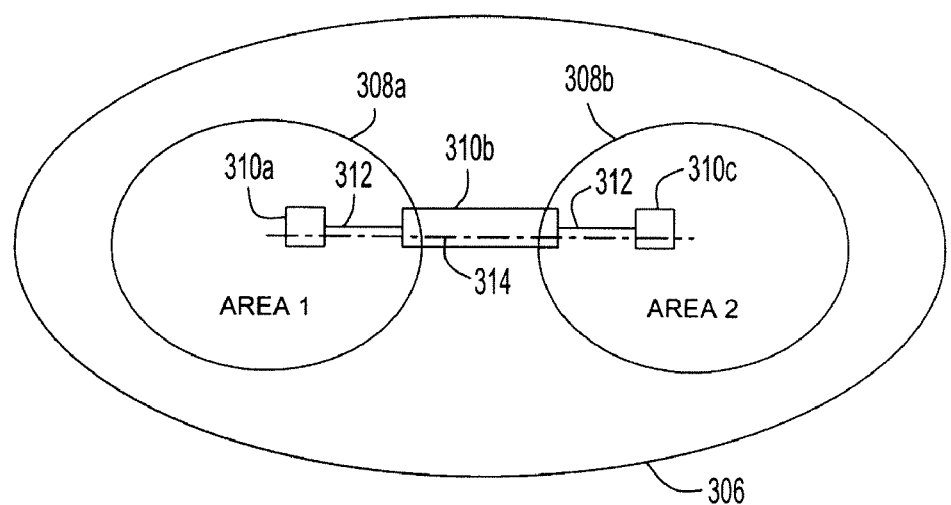
FIG. 3a is a diagrammatic representation of a primary LSP between two areas of an autonomous system.
Figure 3B:
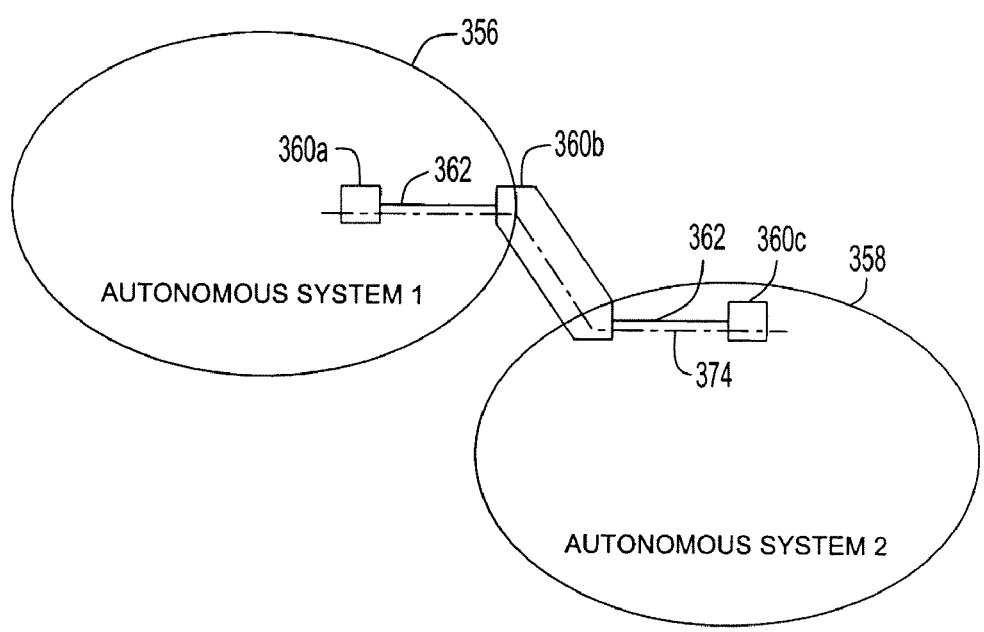
FIG. 3b is a diagrammatic representation of a primary LSP between two autonomous systems.
Figure 4:
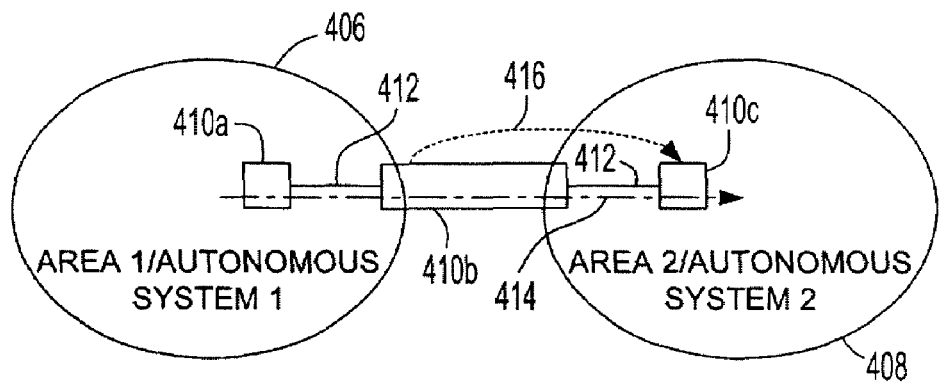
FIG. 4 is a diagrammatic representation of a primary LSP which has an associated backup LSP that bypasses a border router in accordance with an embodiment of the present invention.

With reference to FIG. 4, the determination of whether or not a backup LSP is suitable to protect a primary LSP when the LSPs span more than one area or autonomous region will be described in accordance with an embodiment of the present invention. Nodes 410, e.g., label switch routers, and links 412 are a part of a primary LSP 414 which passes from one region 406 into another region 408. It should be appreciated that when region 406 is an area within an autonomous system, then region 408 may be another area within that autonomous system. Alternatively, when region 406 is a first autonomous system, then region 408 may be a second autonomous system.

Node 410b is a border router and, depending upon whether regions 406, 408 are areas or autonomous systems, node 410b may either be an area border router or an autonomous system border router. When protection is desired for node 410b, a backup LSP 416 may be created between node 410a, which is effectively a head-end node for backup LSP 416, and node 410c, which is effectively a tail-end node for backup LSP 416. Node 410a is also the PLR with respect to backup LSP 416 and primary LSP 414, while node 410c is a merge point with respect to backup LSP 416 and primary LSP 414.

Node 410a is generally aware of the node-identifier (node-ID) which identifies node 410c as the tail-end of LSP 416 which is a backup LSP. Furthermore, it should be appreciated that node 410a may instead be aware of the local topology and, hence, the identifiers of the interfaces associated with node 410c. In the described embodiment, node 410a includes code devices that render node 410a capable of substantially unambiguously identifying node 410c as a merge point between backup LSP 416 and primary LSP 414 using the node-ID which identifies node 410c as the tail-end of backup LSP 416 and information contained in the local topology of node 410c, if such information is available, or with the information contained in the record route object (RRO) of primary LSP 414. The node-ID which identifies node 410c may be provided by a user at the time backup LSP 416 is created, to identify node 410c as the tail-end of backup LSP 416. In the event that the user does not provide a node-ID at the time backup LSP 416 is created, node 410a, which is the PLR, may use the RRO, which includes the node-ID, of backup LSP 416 to identify the tail-end of backup LSP 416.

In order to provide node 410a with the node-ID of node 410c, the node-ID of node 410c may be stored when backup LSP 416 is configured on node 410a. An RRO is associated with primary LSP 414, and is available to substantially all nodes 410 associated with primary LSP 414. An RRO, which may record routes, may be present in resource reservation protocol (RSVP) path and reservation messages, and generally contains a plurality of subobjects. In one embodiment, an RRO includes a subobject called a node-ID subobject where identifiers of nodes 410 that are on the path of primary LSP 414 are stored. The RRO may or may not contain a sub-object corresponding to node 410c. The steps associated with one process of providing node-IDs to the RRO will be discussed below with reference to FIG. 6. Node 410a may identify node 410c as a merge point by comparing the node-ID associated with the tail-end of backup LSP 416 with node-IDs available in the RRO for primary LSP 414.

Figure 5:
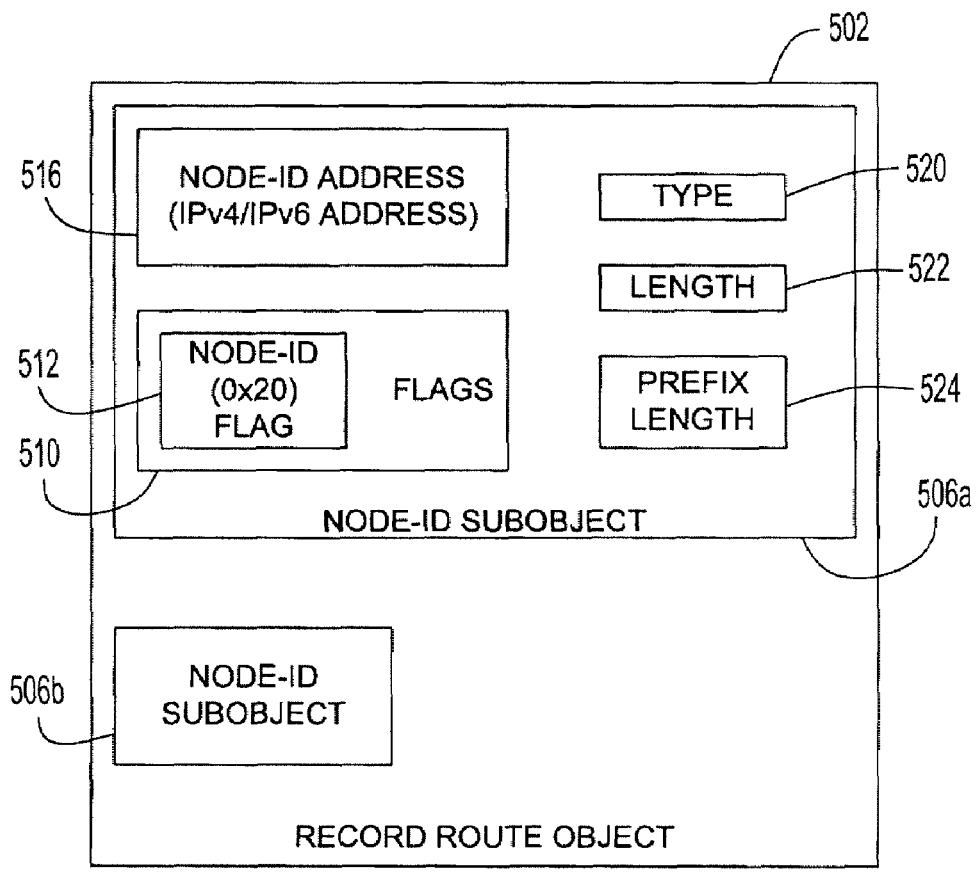
FIG. 5 is a diagrammatic representation of a record route object (RRO) which includes node-ID subobjects in accordance with an embodiment of the present invention.

FIG. 5 is a diagrammatic representation of an RRO in accordance with an embodiment of the present invention. RSVP messages carry various objects that carry information pertaining to LSPs that are signaled via RSVP. The various objects include, but are not limited to, a Label Request Object, an Explicit Route Object, and the RRO. An RRO object generally contains a number of items called subobjects. Some defined subobjects include an IPv4 address subobject, an IPv6 address subobject, and a label subobject. It should be appreciated by one skilled in the art that an element included in an RRO may be a node identifier which may be of address type IPv4 or address type IPv6. A node is represented by an IPv4 address subobject or an IPv6 address subobject when that node is of address type IPv4 or address type IPv6, respectively.

An IPv4 or IPv6 subobject has a flag which is set to indicate whether or not the signaled LSP may be protected, as well as the nature of the protection, e.g., whether the signaled LSP is protected from the failure of a node or the availability of bandwidth guarantee during failure, available for the signaled LSP. In one embodiment, a flag is defined to indicate whether an IPv4 or IPv6 address subobject represents a network node. An IPv4 address or IPv6 address subobject with a node-ID flag set is a node-ID subobject.

As shown in FIG. 5, an RRO 502 may include a multiplicity of subobjects 506. Although node-ID subobjects 506 are shown, it should be appreciated that RRO 502 may include various other subobjects. Other subobjects may include, but are not limited to, suitable IPv4 address subobjects, suitable IPv6 subobjects, and label subobjects. In general, node-ID subobjects 506 may either be IPv4 or IPv6 subobjects, as previously mentioned.

Node-ID subobject 506a generally includes flags 510. A particular node-ID flag 512, e.g., a 0x20 flag, is set to indicate that the identifier or address specified in address field 516 is a node-ID address. A node-ID address may refer to a router address, or a traffic engineering router identifier. Other types of flags (not shown) included in flags 510 may include, but are not limited to, a flag which indicates that local protection is available to a link that is downstream from the node specified in address field 516, a flag that indicates that local protection is in use, a flag that indicates that bandwidth protection is available, and a flag that indicates that node protection is available, as previously mentioned.

A node-ID subobject has an IPv4 address or an IPv6 address. As will be appreciated by those skilled in the art, an IPv4 address may be a 32-bit unicast host address or substantially any network-reachable interface address, while an IPv6 address may be a 128-bit unicast host address. Node-ID subobject 506a may also include a length 522 and a prefix length 524. Length 522 typically contains the total length of node-ID subobject 506a, while prefix length 524 may specify the length of a prefix associated with node-ID subobject 506a, e.g., thirty-two for an IPv4 type and 128 for an IPv6 type.

Figure 6:
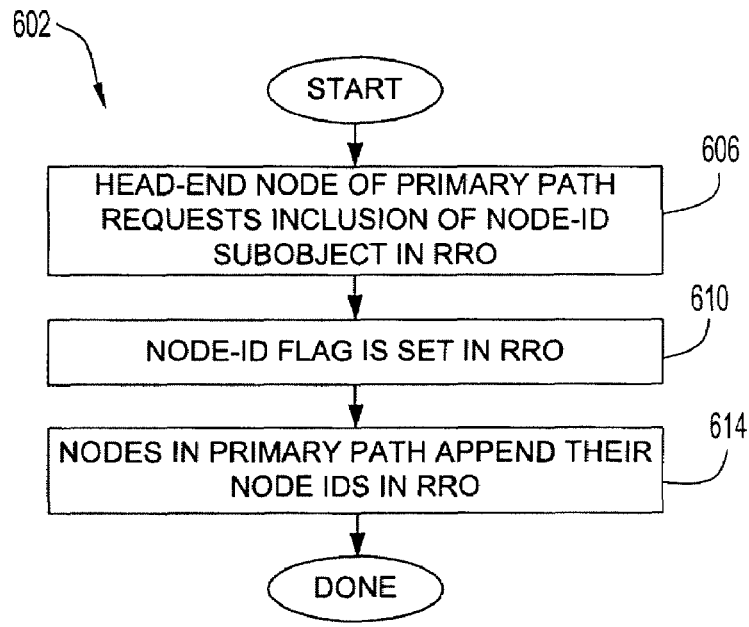
FIG. 6 is a process flow diagram which illustrates the steps associated using an RRO which includes node-ID subobjects in accordance with an embodiment of the present invention.

In one embodiment, there are two preferred approaches for including node-ID subobjects in RROs. With one approach, a node-ID subobject is substantially always included in the RRO. That is, an RRO may effectively always include a node-ID subobject. A second approach for including node-ID subobjects in RROs will be described with reference to FIG. 6. FIG. 6 is a process flow diagram which illustrates the steps associated with one method of using RRO 502 of FIG. 5 in accordance with an embodiment of the present invention. A process 502 of using an RRO begins at step 606 in which the head-end node of a primary LSP requests the inclusion of node-ID subobjects in the RRO associated with the primary LSP. In one embodiment, the request for the inclusion of a node-ID subobject may be made in a PATH message sent by the head-end node of the primary LSP.

Once the head-end node requests that a node-ID subobject be included in the RRO in step 606, the node-ID flag in the RRO or, more specifically, in the node-ID subobject is set in step 610 when a node other than a head-end node appends its node-ID to the RRO. Setting the node-ID flag associated with a node-ID subobject generally involves setting the value of the node-ID flag to indicate that the network element included in the RRO indeed represents a network node. Then, in step 614, substantially each node that is a part of the primary LSP and is capable of supporting node-ID subobjects appends its node-ID in the RRO or, more specifically, a node-ID subobject included in the RRO. In general, if a node does not support node-ID subobjects, that node does not append its node-ID in the RRO. It should be appreciated that substantially any node which corresponds to the tail-end of a backup LSP, i.e., the merge point between the primary LSP and a backup LSP, generally supports node-ID subobjects, especially when primary and backup LSPs span multiple areas or autonomous systems. After the nodes in the primary path append their node-IDs in the RRO, the process of using an RRO is completed.

Figure 7:
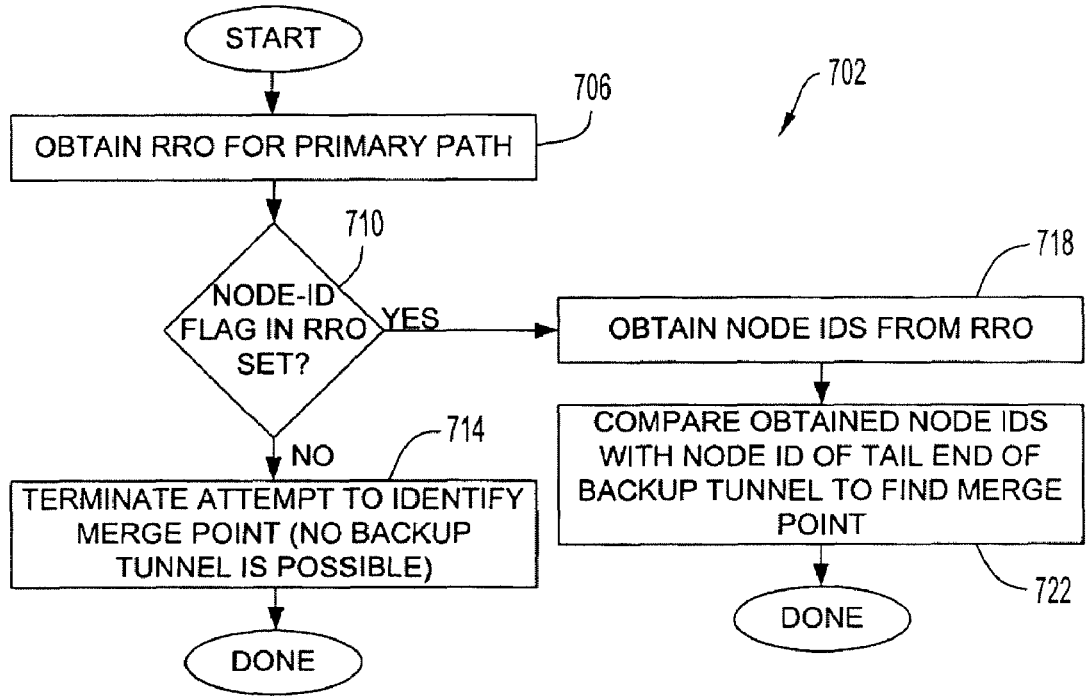
FIG. 7 is a process flow diagram which illustrates the steps associated with using an RRO which includes node-ID subobjects to find a merge point for a backup LSP which bypasses a border router in accordance with an embodiment of the present invention.

An RRO which includes at least one node-ID subobject may be used by a PLR, or a head-end node of a backup LSP, to find a merge point. Finding a merge point enables the merge point address to be provided in RSVP refresh messages sent by the PLR when backup LSPs are used to route traffic. With reference to FIG. 7, the use of an RRO to identify a merge point in a system which protects a border router will be described in accordance with an embodiment of the present invention. A process 702 of identifying a merge point associated with a backup LSP which bypasses a border router begins at step 706 in which the RRO for a primary LSP is obtained, e.g., by the PLR associated with the merge point. Once the RRO is obtained, it is determined in step 710 whether a node-ID flag in the RRO is set. That is, a determination is made as to whether the RRO contains a node-ID subobject. If it is determined that a node-ID flag in the RRO is not set, the implication is that the backup LSP may not be used to bypass the border router. Accordingly, process flow moves to step 714 in which the attempt to identify a merge point is terminated, as no backup LSP suitable for bypassing the border router is possible.

Alternatively, if the determination in step 710 is that a node-ID flag in the RRO is set, then in step 718, node-IDs are obtained from the RRO. In other words, the node-ID of each node which appended its node-ID within the RRO is obtained. After the node-IDs are obtained, the node-IDs are compared to the node ID of the tail-end of the backup LSP which protects the border router in step 722. It should be appreciated that the node-ID of the merge point may not need to be configured on a PLR. Indeed, if the backup LSP terminates at the merge point using its node-ID address as a destination, nothing else is generally required. If the destination address of the backup LSP is an interface of the merge point, then the node-ID subobject is inserted for the backup LSP. Once a merge point is identified, the process of identifying a merge point is completed.

Figure 8:
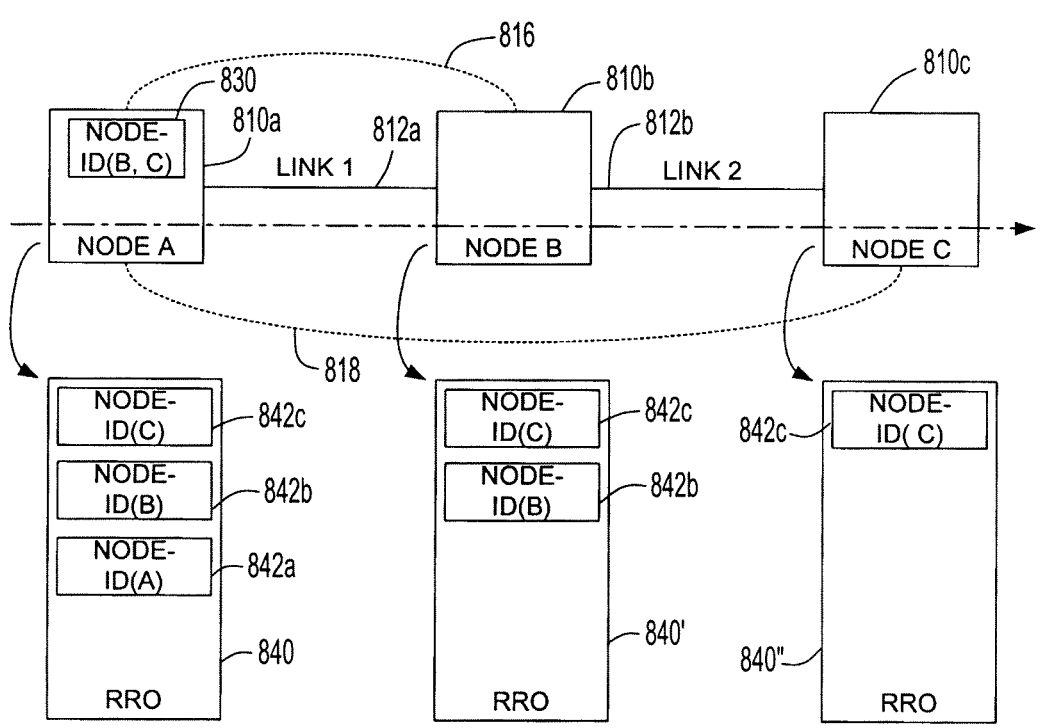
FIG. 8 is a diagrammatic representation of the state of an RRO at various nodes in a primary LSP in accordance with an embodiment of the present invention.

Information available in an RRO for a primary LSP generally varies depending upon where in the primary LSP the RRO is being used. Specifically, at each node in a primary LSP, the RRO substantially only has node-ID addresses for nodes that are downstream from the node. That is, from the point-of-view of each node in a primary LSP with respect to information regarding other nodes in the primary LSP, the RRO contains substantially only information pertaining to nodes which are downstream, and substantially no information pertaining to nodes which are upstream. FIG. 8 is a diagrammatic representation of the state of an RRO at various nodes in a primary LSP in accordance with an embodiment of the present invention. A primary LSP 814 includes nodes 810 and links 812. Node 810b is downstream from node 810a, while node 810c is downstream from node 810b, with respect to primary LSP 814. In one embodiment, nodes 810a, 810b may be in a different region, e.g., area or autonomous system, from node 810c. Alternatively, nodes 810b, 810c may be in a different region from node 810a. As shown, a first backup LSP 816, which is a next hop (NHOP) backup LSP, is arranged to bypass link 812a, while a second backup LSP 818, which is a next hop (NNHOP) backup LSP, is arranged to bypass node 810b.

An RRO 840, if configured accordingly, is generally associated with primary LSP 814. At each node 810, RRO 840 has node-IDs 842 of nodes 810 which are downstream and, optionally, an IPv4 subobject that records outgoing interfaces. By way of example, at node 810c, RRO 840" is in a "first state," and includes a node-ID 842c for node 810c. At node 810b, RRO 840' is in a "second state," and includes a node-ID 842b for node 810b and node-ID 842c for node 810c. Finally, at node 810a, RRO 840 is in a "third stage," and includes node-ID 842a, node-ID 842b, and node-ID 842c.

Node 810a is the head-end node for both backup LSP 816 and backup LSP 818. Hence, node 810a has information 830 pertaining to the tail-ends of backup LSP 816 and backup LSP 818. Backup LSP 816 terminates at the node address of node 810b while backup LSP 818 terminates at the node address of node 810c. In one embodiment, the PLR, i.e., node 810a, of backup LSP 816 and backup LSP 818 may find the node addresses in the node-ID subobject carried in RRO 840 for primary LSP 814. When the node addresses are not available in the node-ID subobject, then a node-ID is included in RRO objects (not shown) of backup LSP 816 and backup LSP 818.

Node 810a may identify merge points associated with backup LSPs 816, 818 and primary LSP 814. For example, node 810a may compare node-IDs 842, destination address of backup LSPs 816, 818, or node-IDs for backup LSPs 816, 818 to identify node 810b as a merge point associated with backup LSP 816 and primary LSP 814, and to identify node 810c as a merge point associated with backup LSP 818 and primary LSP 814.

The storage of node-IDs associated with a primary LSP in an RRO is one method which may be used to enable merge points between a backup LSP which bypasses a border router and the primary LSP to be efficiently identified substantially without ambiguity. Another method which may be used to substantially unambiguously identify a merge point between a primary LSP and a backup LSP which bypasses a border router may involve effectively sharing local topology information, or a list of interfaces, that are associated with the tail-end node of the backup LSP. Some systems may enable local topology information to be shared across areas or autonomous systems by sending the local topology information from one area or autonomous system to another area or autonomous system. In one embodiment, a PLR may obtain the local topology of the tail-end of a backup LSP by sending the tail-end a message.

Figure 9A:
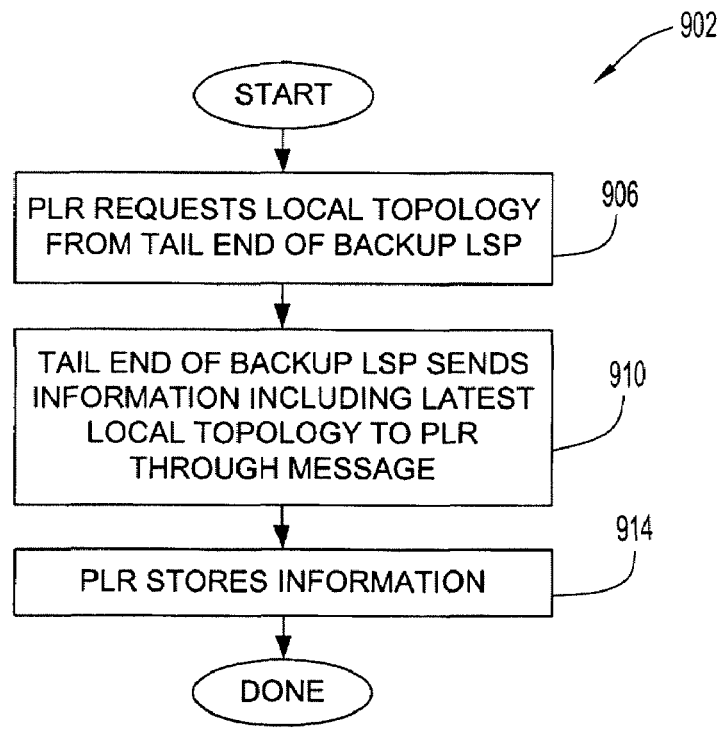
FIG. 9a is a process flow diagram which illustrates the steps associated with providing identifiers of interfaces associated with a tail-end of a backup LSP to a PLR in accordance with an embodiment of the present invention.

With reference to FIG. 9a, the steps associated with providing local topology information from a node at the tail-end of a backup LSP which bypasses a border router to a PLR, or a head-end of the backup LSP, will be discussed in accordance with an embodiment of the present invention. A process 902 of providing local topology information to a PLR begins at step 906 in which a PLR requests local topology information from the tail-end of a backup LSP. The tail-end of the backup LSP, in the described embodiment, is in either a different autonomous system or a different area than the PLR. After the PLR sends the request, i.e., to the tail-end node of the backup LSP, the tail-end of the backup LSP sends information including information relating to its local topology, e.g., identifiers of interfaces that are substantially attached to the tail-end, to the PLR through a message in step 910. In one embodiment, the message is an RSVP reservation message, although it should be appreciated that the message may generally be substantially any suitable message. Once the information sent by the tail-end of the backup LSP is sent, the PLR receives and stores in the information in step 914, and the process of providing local topology information to the PLR is completed. The local topology information may be stored by the PLR into a database that may be accessed by the PLR when it tries to find a merge point.

Figure 9B:
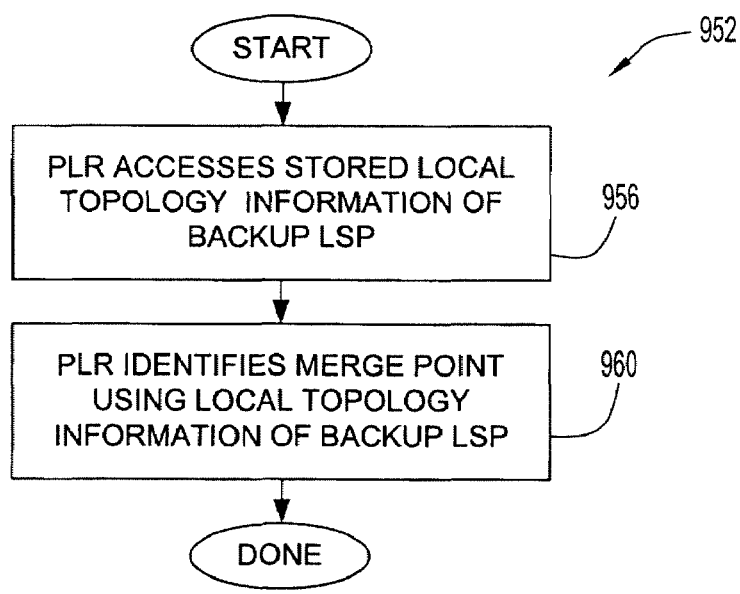
FIG. 9b is a process flow diagram which illustrates the steps associated with finding a merge point using identifiers of interfaces provided to a PLR in accordance with an embodiment of the present invention.

The information regarding the local topology of the tail-end of a backup LSP may be used by an associated PLR, i.e., the head-end of the backup LSP, to identify a merge point. FIG. 9b is a process flow diagram which illustrates the steps associated with finding a merge point using interface addresses stored within a PLR in accordance with an embodiment of the present invention. A process 952 of identifying a merge point begins at step 956 in which the PLR accesses local topology information associated with the tail-end of the backup LSP. In one embodiment, the local topology information was previously obtained and stored by the PLR.

Once the PLR accesses the stored local topology information, e.g., stored identifiers of the interfaces associated with the tail-end of the backup LSP, the PLR identifies the merge point using the local topology information in step 960. In one embodiment, identifying the merge point may involve a comparison of the interface identifiers with the RRO object of the primary LSP. The process of finding the merge point is then completed.

Figure 10:
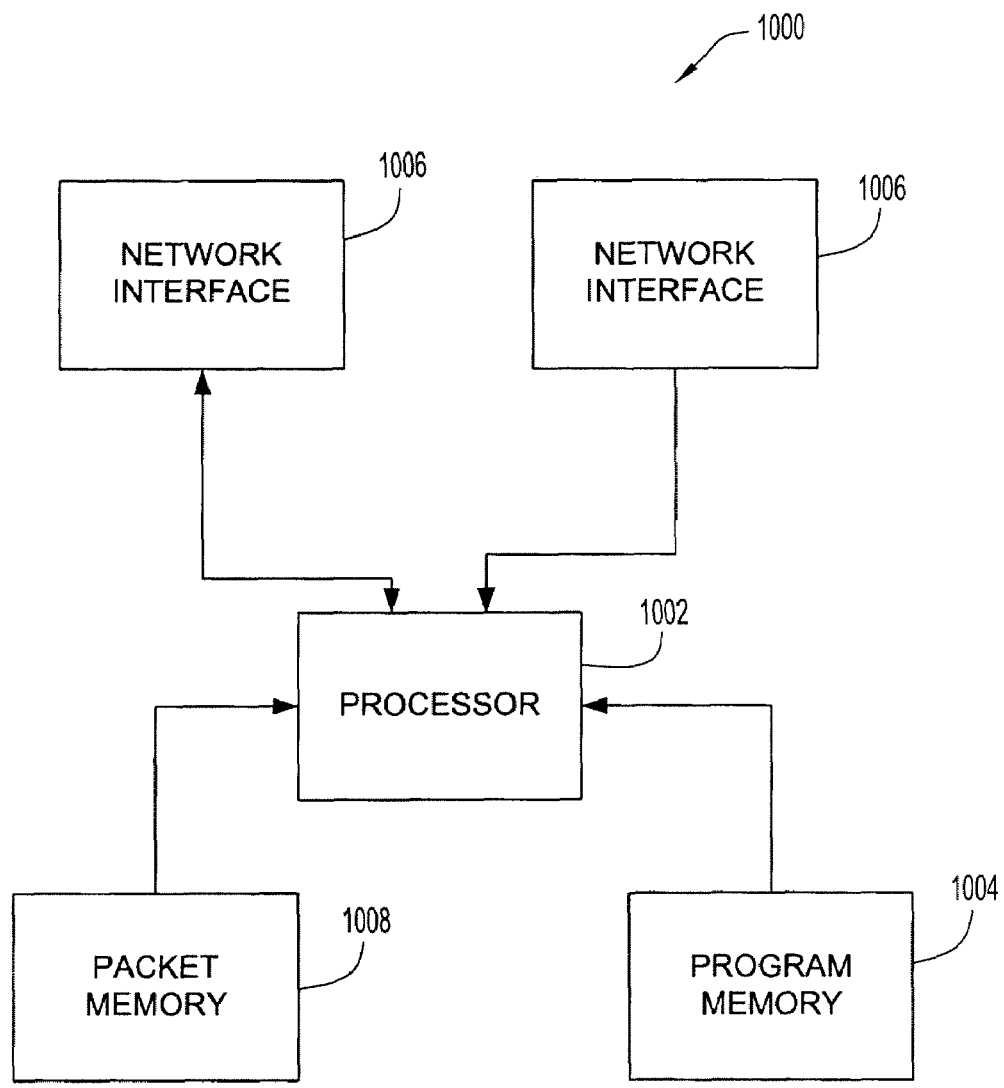
FIG. 10 is a diagrammatic representation of a network device suitable for implementing one embodiment of the present invention.

FIG. 10 depicts a network device that may be used to implement any of the nodes depicted in FIGS. 4 and 8 or a network management workstation. In one embodiment, a network device 1000 is a programmable machine that may be implemented in hardware, software or any combination thereof. A processor 1002 executes code stored in a program memory 1004. Program memory 1004 is one example of a computer-readable storage medium. Program memory 1004 may be a volatile memory. Another form of computer-readable storage medium storing the same codes would be some type of non-volatile storage such as floppy disks, CD-ROMs, DVD-ROMs, hard disks, flash memory, etc. A carrier wave that carries the code across a network is another example of a computer-readable storage medium.

Network device 1000 interfaces with physical media via a plurality of network interfaces 1006. For example, one of network interfaces 1006 may couple to an optical fiber and may incorporate appropriate physical and link layer functionality. Other examples of network interfaces include Ethernet interfaces, DSL interfaces, Gigabit Ethernet interfaces, 10-Gigabit Ethernet interfaces, etc. As packets are received, processed, and forwarded by network device 1000, they may be stored in a packet memory 1008. Network device 1000 implements all of the network protocols and extensions thereof described above as well as the features provided by the present invention.

Although only a few embodiments of the present invention have been described, it should be understood that the present invention may be embodied in many other specific forms without departing from the spirit or the scope of the present invention. By way of example, while a node-ID subobject in an RRO has been described as being suitable for use in locating a merge point that is in either a different area or a different autonomous system from an associated PLR. However, a node-ID subobject may also be suitable for use in efficiently identifying a merge point that is either in the same area as or the same autonomous systems as an associated PLR.

The purposes for which a node-ID subobject in an RRO is used may vary widely. For instance, as per the RSVP specification, an LSR may include more than one IPv4 subobject in an RRO object, which makes it relatively difficult for an upstream node to determine the number of hops an LSP traverses by counting the number of IPv4 subobjects present in the RRO object. The node-ID subobject may be used for this purpose, which may be useful in a variety of different situations.

While border routers have generally been described as being located at the borders of areas or autonomous systems, border routers may also be located at the borders of levels. That is, for an open shortest path first (OPSF) protocol, border routers may be located at the borders of areas, whereas for an intermediate system to intermediate system (ISIS) protocol, border routers may be located at the borders of levels. Hence, the bypassing of border routers at the borders of areas using backup LSPs generally applies to the bypassing of border routers at the borders of levels.

Generally, the steps associated with the various methods and processes of the present invention may vary widely. Steps may be altered, reordered, removed, and added without departing from the spirit or the scope of the present invention. Therefore, the present examples are to be considered as illustrative and not restrictive, and the invention is not to be limited to the details given herein, but may be modified within the scope of the appended claims.

What is claimed is:

1. A method for finding a merge point between a primary label switched path (LSP) and a backup LSP in a network, the method comprising:
    obtaining identifying information from a record route object associated with the primary LSP, the identifying information from the record route object associated with the primary LSP being arranged to identify a first node included in the primary LSP; and comparing the identifying information from the record route object associated with the primary LSP with an identifier associated with the backup LSP to identify the merge point, the backup LSP having a head-end and a tail-end in different regions, the different regions are one of autonomous systems, areas, and levels.

2. The method of claim 1 wherein the identifying information from the record route object associated with the primary LSP is a node address associated with the first node.

3. The method of claim 2 wherein the node address is present in a node-ID subobject of the record route object.

4. The method of claim 1 wherein the identifier is one of a destination address associated with the tail-end backup LSP and a node address associated with the backup LSP.

5. The method of claim 1 further including receiving the identifier from the tail-end node of the backup LSP.

6. The method of claim 1 wherein the backup LSP is arranged to bypass a border router, the border router being located substantially at a border of one of the different regions, the border router being a part of a path traversed by the primary LSP.

7. The method of claim 1 wherein the identifying information from the record route object associated with the primary LSP is a first identifier, the first identifier being arranged to identify the first node.

8. The method of claim 7 wherein the record route object includes a node-identifier flag, the node-identifier flag being arranged to indicate that the first identifier is stored in the record route object.

9. A network element, the network element being arranged to find a merge point between a primary LSP and a backup LSP associated with the network element, the network element comprising:
   code devices that obtain a first identifier from a record route object associated with the primary LSP, the first identifier being arranged to identify a first node included in the primary LSP; and
   code devices that compare the identifying information from the record route object associated with the primary LSP with a second identifier associated with the backup LSP to identify the merge point, the backup LSP including a head-end in a first region and a tail-end in a second region, each region a different autonomous system, area, and level from the other region.

10. The network element of claim 9 wherein the identifying information from the record route object associated with the primary LSP is a node address associated with the first node.

11. The network element of claim 9 wherein the second identifier is one of a destination address associated with the tail-end and a node address associated with the backup LSP.

12. The network element of claim 9 further including code devices that receive the second identifier from the tail-end node of the backup LSP.

13. The network element of claim 9 wherein the backup LSP is arranged to bypass a border router, the border router being located substantially at a border of one of the different regions, the border router being a part of a path traversed by the primary LSP.

14. The network element of claim 9 wherein the identifying information from the record route object associated with the primary LSP is a first identifier, the first identifier being arranged to identify the first node.

15. A network element, the network element being arranged to find a merge point between a primary LSP and a backup LSP associated with the network element, the network element comprising:
   means for obtaining a first identifier from a record route object associated with the primary LSP, the first identifier being arranged to identify a first node included in the primary LSP; and
   means for comparing the identifying information from the record route object associated with the primary LSP with a second identifier associated with the backup LSP to identify the merge point, the backup LSP having a head-end and a tail-end that are in different regions;
   whereby the backup LSP operates across the different regions.

16. The network element of claim 15 wherein the identifying information from the record route object associated with the primary LSP is a node address associated with the first node.

17. The network element of claim 16 wherein the node address is present in a node-ID subobject of the record route object.

18. The method of claim 15 wherein the second identifier is one of a destination address associated with the tail-end backup LSP and a node address associated with the backup LSP.

19. A method for identifying a merge point between a primary LSP and a backup LSP in a network that supports multi-protocol label switching fast reroute, the backup LSP being arranged to bypass an element in the primary LSP, the method comprising:
   obtaining a flag from a record route object associated with the primary LSP, the flag being arranged to indicate when a node address is stored in the record route object;
   obtaining the node address from the record route object when it is determined that the flag indicates that the node address is stored in the record route object;
   comparing the node address to a node identifier associated with a tail-end of the backup LSP to determine when the node address substantially matches the node identifier when it is determined that the flag indicates that the node address is stored in the record route object; and
   identifying the merge point when it is determined that the node address substantially matches the node identifier.

20. The method of claim 19 wherein the element that is bypassed by the backup LSP is a border router associated with a first region in the network, the backup LSP having a first end that is in the first region and a second end that is in a second region of the network.

21. The method of claim 20 wherein the first region is one of a first autonomous system, a first level, and a first area, and the second region is one of a second autonomous system, a second level and a second area.

22. A network element, the network element being arranged to identify a merge point between a primary LSP and a backup LSP in a network that supports multi-protocol label switching fast reroute, the backup LSP being arranged to bypass an element in the primary LSP, the network element comprising:
   means for obtaining a flag from a record route object associated with the primary LSP, the flag being arranged to indicate when a node address is stored in the record route object;
   means for obtaining the node address from the record route object when it is determined that the flag indicates that the node address is stored in the record route object;
   means for comparing the node address to a node identifier associated with a tail-end of the backup LSP to determine when the node address substantially matches the node identifier when it is determined that the flag indicates that the node address is stored in the record route object; and means for identifying the merge point when it is determined that the node address substantially matches the node identifier.

23. The network element of claim 22 wherein the element that is bypassed by the backup LSP is a border router associated with a first region in the network, the backup LSP having a first end that in the first region and a second end that is in the second region.

24. The network element of claim 23 wherein the first region is one of a first autonomous system, a first level, and a first area, and the second region is one of a second autonomous system, a second level and a second area.

25. The network element of claim 22 wherein the head-end of the backup LSP and a tail-end of the backup LSP are in different regions in the network.

26. The network element of claim 25 wherein the different regions are one of different areas, different levels, and different autonomous systems.

* * * * *

UNITED STATES PATENT AND TRADEMARK OFFICE
CERTIFICATE OF CORRECTION

PATENT NO. : 7,626,925 B1 Page 1 of 1
APPLICATION NO. : 10/465179
DATED : December 1, 2009
INVENTOR(S) : Sivabalan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1409 days.

Signed and Sealed this

Twenty-first Day of December, 2010

David J. Kappos
*Director of the United States Patent and Trademark Office*